United States Patent Office 3,847,847
Patented Nov. 12, 1974

3,847,847
PROCESS FOR PREPARING PIGMENTED ACRYLIC DISPERSION LACQUER COATING COMPOSITIONS BY USING CELLULOSE ACETATE BUTYRATE RESIN
Gary W. Orvis, Flint, Mich., assignor to E. I. du Pont de Nemours and Company, Wilmington, Del.
No Drawing. Filed Dec. 22, 1972, Ser. No. 317,379
Int. Cl. C08b 21/08; C09d 3/14, 3/80
U.S. Cl. 260—17 R
9 Claims

ABSTRACT OF THE DISCLOSURE

The improved process for preparing a pigmented acrylic dispersion lacquer coating composition comprises the following steps:

(1) blending together pigment, cellulose acetate butyrate resin, an acrylic lacquer dispersion resin and an organic plasticizer;
(2) heating the blend prepared above and applying a vacuum to remove solvent and form a powder;
(3) high shear mixing the powder on a two roll mill having one roll heated and one cold roll to form pigment chips;
(4) forming a mill base by dissolving the pigment chips in an organic solvent; and
(5) blending the mill base with an acrylic dispersion lacquer composition to form a pigmented coating composition;

the pigmented resulting acrylic dispersion lacquers are particularly useful as finishes for the exterior of automobiles and trucks.

BACKGROUND OF THE INVENTION

This invention relates to an improved process for preparing a pigmented acrylic dispersion lacquer coating composition.

Acrylic polymer dispersions are well known in the art as shown by Thompson U.S. Pat. 3,382,297, issued May 7, 1968 and Duell et al. U.S. Pat. 3,383,352, issued May 14, 1968. In general, there have been problems in dispersing certain pigments in these coating compositions and in some instances some pigments cannot be used in these coatings since they cannot be adequately dispersed. Standard techniques of sand-grinding ball milling, pebble grinding do not adequately disperse these pigments so that the pigments can be used in acrylic dispersions. In particular, certain pigments, such as indolinone pigments, quinacridones, oxides, in particular iron oxides, copper phthalocyanine blues, greens and carbon black, cannot be dispersed by these standard techniques to provide high quality pigmented acrylic dispersions.

The novel process of this invention disperses all types of pigments in mill bases that can be used in acrylic dispersion lacquer coatings and provides finishes which have the high standards of appearance required by the automobile industry.

SUMMARY OF THE INVENTION

The improved process for preparing a pigmented acrylic dispersion lacquer coating composition comprises the following steps:

(1) blending together the following constituents to form a pigment/polymer blend
15–50% by weight of a pigment,
15–35% by weight of cellulose acetate butyrate having a butyryl content of about 30–55% by weight and a viscosity at 25° C. of about 0.5–5 seconds measured according to ASTM D–1343–56; and
15–55% by weight of a film-forming acrylic dispersion lacquer resin;
0–20% by weight of an organic plasticizer for the acrylic dispersion lacquer resin;
(2) heating the pigment polymer blend prepared in step (1) to about 30–110° C. while mixing and applying a vacuum of at least 20 inches of mercury to remove any solvent from the blend and to form a powder;
(3) mixing the powder under high shear conditions by charging the powder into a two roll mill having one hot roll at about 65–125° C. and a cold roll at about 0–30° C. for about 5–20 minutes while applying 75–400 foot pounds per gram of charge per minute to form pigment chips;
(4) forming a mill base having a solids content of about 20–60% by weight by dissolving the chips prepared in step (3) in an organic solvent for the chips; and
(5) blending the mill base prepared in step (4) with an acrylic dispersion lacquer composition to form a pigmented coating composition having a pigment to binder ratio of about 2:100 to about 70:100.

DESCRIPTION OF THE INVENTION

In the first step of the novel process of this invention, 15–50% by weight of a pigment or a mixture of pigments is blended with 15–35% by weight of cellulose acetate butyrate and 15–55% by weight of a film-forming acrylic dispersion lacquer resin or the acrylic dispersion lacquer. Optionally, up to 20% by weight of organic plasticizer for acrylic dispersion lacquer resin can be added. Preferably, 20–40% by weight of pigment is blended with 20–30% by weight of cellulose acetate butyrate and 40–50% by weight of an acrylic dispersion lacquer resin. The constituents are blended in conventional batch equipment to wet the pigment surface.

The resulting pigment polymer blend is then heated to about 30–110° C., preferably 35–75° C., while applying a vacuum of at least 20 inches of mercury, preferably 20–26 inches of mercury, to remove residual solvent from the blend to form a powder. A 200 gallon Baker-Perkins batch mixer with vacuum equipment and double Nabin blades and a 100 horsepower motor is used.

The resulting powder is then milled under high shear conditions to thoroughly disperse the pigments. This is accomplished by charging the powder into a standard roller mill which has at least one roll, held at about 65–125° C., preferably 90–110° C., and a cold roll at about 0–30° C., preferably, 0–10° C. The powder is rolled on the mill for about 15–40 minutes, preferably 20–35 minutes, while applying a shear force of about 75–400 foot pounds per minute per gram of charge or expressed in another set of units of about 4,000–20,000 foot pounds per linear inch of roll per minute. If necessary, up to 10% of a high polar solvent or ethylene glycol monoethyl ether acetate can be added to the blend to enhance the milling process by obtaining improved contact adhesion with the rollers of the mill. The resulting product is stripped from the rolls, cooled and pulverized into small particles which are referred to as pigment chips.

These pigment chips are then formed into a mill base by dissolving the chips in an organic solvent for the chips providing a mill base that has a solids content of about 20–60%. This mill base is then blended with a clear acrylic dispersion lacquer composition to form the resulting coating composition that has a pigment to binder ratio of 2:100 to about 70:100.

In a modification of the novel process of this invention with certain pigments, chips can be formed by blending the pigment, acrylic dispersion lacquer resin and optionally the plasticizer, and drying and milling the blend under the above high shear conditions. Also, with some pigments, it is possible to use only cellulose acetate butyrate and optionally a plasticizer to form pigment chips by the above process.

The novel process of this invention is particularly useful in dispersing the following types of pigments which cannot be dispersed by conventional techniques, such as carbon blacks, quinacridone pigments, such as magenta quinacridone, isoindolinone pigment, such as "Irgazin" yellows and oranges, phthalocyanine blues, greens and yellow greens, "Monastral" blue, "Monastral" green pigments, "Perylene" red pigments, iron oxide yellow pigments and red pigments. Obviously, any of the other conventional pigments that can be used in these acrylic coating compositions, for example, metallic oxides, such as titanium dioxide, zinc oxide, metal hydroxide, metal flakes, metal powders, chromates, sulphates, carbonates, silica, chalk, and the like, can also be dispersed by the novel process of this invention.

The cellulose acetate butyrate used in the novel process of this invention has a viscosity of about 0.5–5 seconds measured according to ASTM D–1343–56 and has a butyryl content of about 30–55% by weight. Preferably, the cellulose acetate has a viscosity of 1–2 seconds and a butyryl content of about 30–40% by weight.

Up to 20% by weight, and preferably 5–15% by weight, of an organic plasticizer can be used in the novel process of this invention, such as phthalate esters, for example, butylbenzyl phthalate, dibutyl phthalate, 2-ethylhexylbenzyl phthalate, dicyclohexyl phthalate, dibenzyl phthalate, butylcyclohexyl phthalate, di-2-ethylhexyl ester of hexamethylene diphthalate, di-(methylcyclohexyl) phthalate. One preferred plasticizer of this group is butylbenzyl phthalate. Other plasticizers that can be used are mixed benzoic acid and fatty oil acid esters of pentaerythritol, coconut oil/ethylene glycol/phthalic anhydride esters, poly(propylene adipate) dibenzoate, diethylene glycol dibenzoate, ethylene glycol adipate, benzoate, and neopentyl glycol adipate benzoate. Reactive plasticizer such as 2-ethylhexyl acrylate/trimethylol propane/phthalic anhydride esters can also be used. Other useful plasticizers are tetrabutylthiodisuccinate, butylphthalyl butyl glycolate, acetyltributyl citrate, dibenzyl sebacate, tricresyl phosphate, toluene ethylsulfonamide.

The acrylic dispersion lacquer composition used in the novel process of this invention in step (5) in which the mill base is blended with the acrylic dispersion lacquer composition has a film-forming polymer solids content of about 10–60% by weight, and preferably 20–40% by weight. The film-forming polymer comprises a graft copolymer represented by the recurring structural unit A–B, where A is the backbone segment of the molecule and B is the graft segment attached to a chemical bond. It is recognized that homopolymer and copolymer is also present. The amount of graft copolymer is about 30–90% by weight of the film-forming polymer.

In step (1) of the novel process of this invention, the acrylic dispersion lacquer resin can be in the form of the dispersion or the resin that is used the residual from the dried lacquer composition. In any case, the resin of film-forming polymer used in steps (1) and (5) of the novel process are the same.

In the film-forming polymer of the acrylic dispersion lacquer composition, the A portion of the graft copolymer is further represented by an a–b structure, i.e., the backbone is a copolymer composed of monomer units (a) and monomer units (b), where the (a) portion, i.e., the (a) monomer units, of the A segment is composition of monomer units from monomers of the general structure:

Formula (1)

$$CH_2=\overset{R}{\underset{}{C}}COOR^1$$

where

R is H, $CH_3$ or $CH_2CH_3$, and $R^1$ is an alkyl or cycloalkyl group of 1 through 18 carbon atoms.

These monomers are esters of acrylic acid, methacrylic acid and ethacrylic acid, lower alkyl methacrylates, where the alkyl group had 1–10 carbons being preferred with alkyls of 1–4 carbons, such as methyl methacrylate and a blend of methyl methacrylate and isodecyl methacrylate being especially preferred.

The (a) portion should constitute at least 85% by weight of the total A segment.

Although ordinarily the (a) portion will be composed entirely of the units referred to above, up to about 50% of its weight can consist of other monomers which do not contribute active grafting sites to the backbone. Illustrative of these are acrylic acid, methacrylic acid, and their amides and nitriles such as acrylonitrile and methacrylonitrile; vinyl acetate; styrene; α-methyl styrene; vinyl toluene, 3-(2-methacryloxyethyl) - 2,2 - spirocyclohexyloxazolidine, and the like.

The (b) portion, i.e., the monomer units (b), of the A backbone segment provides the potential active grafting sites, i.e., points for attachment for the B branch segment or segments.

The (b) portion of the A segment, which comprises up to 15%, preferably 0.2–5%, even more preferably, 0.4–3%, by weight of the total A segment, can be any monomer units that provide available active grafting sites for graft polymerization. Representative of useful grafting site monomer units are those having the following general formula Formula (2)

$$CH_2=\overset{Y}{\underset{\underset{Z}{|}}{\overset{|}{C}}}$$
$$\phantom{CH_2=C}\overset{|}{X}$$

where

X is $$-\overset{O}{\overset{\|}{C}}-O-$$

(the carbon atom in this group being attached directly to the backbone), $$-O-, \text{ or } -\overset{O}{\overset{\|}{C}}-;$$

Y is hydrogen, $-CH_3$ or $-CH_2CH_3$;

Z is $$-CH_2-\overset{R_2}{\underset{}{C}}=CH-R_3$$

where $R_2$ and $R_3$ are $$Y-CH_2-\!\!\!\bigcirc\!\!\!-R_4, \ -CH_2-N\!\!\begin{array}{c}R_4\\ R_5\end{array}, \ -CH_2CH_2-N\!\!\begin{array}{c}R_4\\ R_5\end{array}$$

where $R_4$ and $R_5$ are H or alkyl of 1 through 4 carbon atoms, or $$-CH_2-CH_2-O-R_6$$

where $R_6$ is alkyl of 1 through 4 carbon atoms;

$$-CH_2CH_2-O-\overset{O}{\overset{\|}{C}}-\underset{Y}{\overset{|}{C}}=CH_2;$$

$$-CH_2-\overset{H}{\underset{\underset{OH}{|}}{\overset{|}{C}}}-CH_2O\overset{O}{\overset{\|}{C}}-\overset{Y}{\underset{}{\overset{|}{C}}}=CH_2$$

where Y has the same meaning as above;

$$-CH_2\overset{H}{\underset{\underset{OH}{|}}{\overset{|}{C}}}-CH_2NHCH_2CH=CH_2;$$

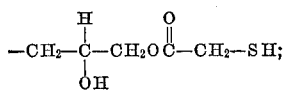

or

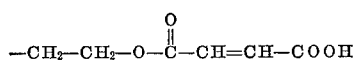

provided that when X is

Z is —H or —NH—CH$_2$—CH=CH$_2$ and provided further that the combined —X—Z group can be

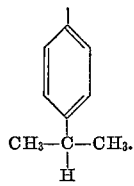

Allyl methacrylate and diethylaminoethyl methacrylate are preferred.

The B segment is the branch segment or branch segments of the graft copolymer. Like the (a) portion of the polymeric backbone segment A, the B segment of the graft copolymer molecule is composed of monomer units from monomers of the general structure of Formula (1) above.

As in the case of the (a) portion, the B portion of the graft copolymer molecule will ordinarily be composed entirely of acrylic units as mentioned above. However, up to about 50% by weight of the B portion can consist of other monomers which do not contribute active grafting sites to the backbone. Illustrative of these are acrylic acid, methacrylic acid and their amides and nitriles such as acrylonitrile and methacrylonitrile; vinyl acetate; styrene; α-methyl styrene; vinyl toluene; 3-(2-methacryloxyethyl)-2-spirocyclohexyl-oxyzolidine, and the like.

Especially preferred B segments are composed of 2-ethylhexyl acrylate units, butyl acrylate units, or combinations of the two or acrylonitrile.

The B portion of the graft copolymer is always the branch segment and will not contain any significant amount of a component which provides active grafting sites such as previously indicated by (b).

As will readily be understood by persons in this art, preparation of graft copolymers described above will typically result in a mixture of polymer molecules, of varying number of grafted side chains per molecule. The average number of grafted B segments per A or backbone segment is ordinarily 0.5–5, preferably 1–2.

Although the backbone or A segment can be composed of the same general polymeric structure as the branch or B segment except for the (b) portion of A, the selection of the particular monomers used in the A and B segments of the graft copolymer should be such that either A or B, if prepared as a separate polymeric entity, is substantially soluble in the organic medium of the dispersion, whereas, the other of A and B, if prepared as a separate polymeric entity, is substantially insoluble in the same organic medium. Therefore, in all instances, the backbone including grafting sites or (b) portion, must exhibit a distinct contrast in solubility with the branch segment. Thus, the dispersion may have a soluble backbone and an insoluble graft or an insoluble backbone and a soluble graft for any given organic medium.

A segment is substantially soluble in a particular organic medium when, added as a separate polymeric entity, it will form a clear solution in this particular medium. A segment is substantially insoluble when, added as a separate polymeric entity, it will not form a clear solution in the organic medium irrespective of how much solvent is added.

Proper solubility parameter balance between the soluble and soluble segment of the graft copolymer used is important. To achieve maximum stability, the solubility parameter of the insoluble segment (determined as an entity) should differ from that of the soluble segment (determined as an entity). The solubility parameter of the soluble segment and continuous phase (everything in a liquid state) should be similar to achieve maximum stability.

It should be noted that solubiilty parameter of the soluble or insoluble segment taken as an entity is a single value. This value is obtained as a result of a simple algebraic relationship based on the solubility parameter of the monomers which form the polymeric entity and the ratio of the monomers to the total monomeric composition of the entity.[1]

A solubility parameter gradient between the insoluble segment of the graft copolymer and the soluble segment or continuous phase should be at least plus or minus 0.5 parameter unit, for an acceptable dispersion stability, preferably at least plus or minus 1.0 unit. A solubility parameter difference of less than 0.2 unit will lead to dispersions of markedly reduced stability.

The insoluble segment comprises from 20–95% by weight of the total A-B graft copolymer, preferably 65–90%. It will have a number average molecular weight of 10,000–450,000. Particular advantages are obtained, especially when the dispersion is used as a coating composition, when the insoluble segment is at least about 50% by weight of the total graft copolymer. Best results in automotive finish applications are obtained when the insoluble segment is at least about 70% by weight of the total graft copolymer.

The soluble segment ordinarily constitutes from 5–80% by weight of the total graft copolymer, preferably 10–35%. The number average molecular weight of the soluble segment ranges from about 2,000–50,000.

The preparation of the graft copolymers of the dispersion is accomplished by polymerizing the monomer of the graft copolymer in a good solvent, i.e., one in which both the individual backbone and graft segments and subsequent graft copolymers formed therefrom are soluble. Illustrative of such solvents which form a solution of the graft copolymer or segments thereof are esters, ketones and aromatic hydrocarbons, preferred good solvents are methyl ethyl ketone, xylene, toluene, ethylene glycol monoethyl ether, ethylene glycol monoethyl ether acetate, diethylene glycol monobutyl ether, dimethyl phthalate, diethyl phthalate, diethyl adipate, hexalene glycol diacetate, ethylene glycol diacetone and diacetone alcohol.

In order to convert the graft copolymer solution to a dispersion, an organic liquid of such solvency is added so that the resulting solvent mixture becomes a nonsolvent

---

[1] Solubility parameter of a substance $$= \sqrt{\frac{(\text{Heat of vaporization}) \times (\text{densiy})}{\text{Molecular weight}}}$$

Since the heat vaporization is a factor directly influencing the solubility parameter value, the solubility parameter is a value which is absolute and take into account all the physical forces acting on any specific polymer.

or poor solvent for one of the segments of the graft copolymer but remains a solvent for the other segment.

This effectuates the conversion and produces the desired dispersion. Illustrative of such poor solvents are aliphatic hydrocarbons such as pentane, hexane, VM and P naphtha, petroleum ethers, aliphtic alcohols such as ethanol and propanol, Isopar-E, mineral spirits, dibutyl Carbitol, butyl Cellosolve, and mixtures of these.

This partial solubility of the graft copolymer macromolecule produces the self-stabilization of the dispersions. This does not preclude the use of external or other stabilizers, particularly when one operates close to the edge or self-stabilization of the system.

Preferably, the acrylic dispersion lacquer is applied by spraying. In order to apply the film-forming graft copolymer to a substrate in a dual solvency system, the system can be prepared by the addition of suitable solvents which cause the dispersion system to contain at least one poor solvent and at least one good solvent for the film-forming polymer as a whole.

The poor solvent or poor solvent mixture as a whole should be more volatile than the good solvent or good solvent mixture as a whole and will ordinarily have a mean boiling point (determined from its boiling range) falling within the limits of about 30° C. through 220° C., preferably 60–200° C.

The good solvent or good solvent mixture as a whole for the film former should be less volatile than the poor solvent or poor solvent mixture as a whole and should have a mean boiling point within the limits of about 50° C. through 350° C., preferably 80–320° C.

For optimum spray application, the weight ratio of good solvent to poor solvent should be 40/60 to 70/30. There should be present in the solvent blend an amount of a good solvent component equal to about 25–200% of the weight of total film-forming polymer present, which good solvent component has a weight average boiling point at least about 10° C. higher than the mean boiling point of the poor solvent component having the highest boiling range, i.e., the poor solvent component which has the highest dry point.

The graft polymer particles in the acrylic dispersion average from 0.05 micron to about 2 microns in diameter. The dispersions are stable against settling and can remain in storage for extended periods without caking, flocculating or coagulating.

The graft copolymers used as film-formers in the acrylic dispersion can be made by first preparing the A segment, the backbone. This is done by conventionally copolymerizing the (a) portion with the (b) portion. Suitable amounts of appropriate monomers are mixed together in an organic liquid in which the resulting backbone will be soluble, such as esters, ketones or aromatic hydrocarbons, together with from 0.1–2% by weight of a free radical polymerization initiator such as benzoyl peroxide, azobisisobutyronitrile or the like.

This mixture is then brought to the reaction temperature and maintained at this temperature until polymerization is 75–95% complete.

To the reaction mixture in one or more portions, appropriate amounts of the grafting monomer(s) and from 0.1–2% of a graft initiator such as $t$.-butyl peroxypivalate, $t$.-butyl peracetate, or benzoyl peroxide are then added. The reaction mixture is brought to its reflux temperature and held at this temperature until conversion to the graft copolymer is obtained. This is determined by analysis for unreacted monomers.

Optionally, at this point, further addition of monomers can be made if desired for further polymerization with the graft copolymer or with any other monomeric or polymeric materials that may be present. Preferably, such monomers will be from the group of monomers used in formation of the non-grafting-site portion of the backbone. Most preferably, monomeric methyl methacrylate can be used at this stage.

Optionally, solutions of preformed compatible polymers can be added at this time to the reaction mass. For example, polymethyl methacrylate, cellulose esters such as cellulose acetate butyrate, polyvinyl acetate, etc., or mixtures thereof can be added.

The resulting reaction product is made into a stabilized dispersion by the addition of a poor solvent (as previously defined) for the graft copolymer can be used directly to prepare coating compositions.

Two preferred graft copolymers utilized in the acrylic dispersion lacquer used in the novel process of this invention have the following composition: a backbone of methyl methacrylate/allylacrylate and diethylaminoethyl acrylate having a graft side chain of 2-ethylhexyl acrylate wherein the constituents are in the following weight ratio: 80–85% by weight methyl methacrylate, 14–16% 2-ethylhexyl acrylate, 0.5–2% diethylaminoethyl methacrylate and 0.5–2% of allyl methacrylate. One preferred composition comprises methyl methacrylate 82.8%, 2-ethylhexyl acrylate 15.8%, diethylaminoethyl methacrylate 0.8% allyl methacrylate 0.6%. Another particularly useful copolymer comprises 80–85% methyl methacrylate, 8–10% isodecyl methacrylate, 0.5–2% allyl methacrylate and 0.1–2% methacrylic acid, and has a side chain attached to allyl methacrylate of 8–10% acrylonitrile; preferred graft copolymers of this type have the following weight ratio: methyl methacrylate 80.2%, acrylonitrile 8.9%, isodecyl methacrylate 9.8%, allyl methacrylate 1.0%, methacrylic acid 0.1%; methyl methacrylate 80%, acrylonitrile 8%, allyl methacrylate 1%, methacrylic acid 1%, isodecyl methacrylate 10%.

Many of the solvents utilized to dissolve the pigmented chips are those that are aforementioned as good solvents for the acrylic graft copolymer. However, it is possible to use a blend of the good solvent and a poor solvent to dissolve the chips so long as the resulting mill base is compatible with the acrylic dispersion lacquer to form a high quality composition.

The following examples illustrate the novel process of this invention.

EXAMPLE 1

Pigment chips are prepared as follows:

| | Parts by weight |
|---|---|
| High color black pigment [1] | 11.11 |
| Cellulose acetate butyrate [2] | 16.67 |
| Acrylic dispersion resin solution [3] | 72.22 |
| Total | 100.00 |

[1] Carbon black pigment.
[2] 2-second viscosity CAB measured according to ASTM D-1343–56 and having a butyryl content of about 37%.
[3] 39.9% solids of a copolymer prepared by reacting methyl methacrylate/acrylonitrile/allyl methacrylate/isodecyl methacrylate/methacrylic acid in the ratio of 80/8/1/10/1 to provide a graft copolymer having a backbone of methyl methacrylate/isodecyl methacrylate/methacrylic acid/allyl methacrylate with a grafted segment of acrylonitrile wherein the polymer has a relative viscosity measured at 25° C. of about 1.23–1.25 measured at 0.5% polymer in dichloroethane.

The ingredients are charged into a conventional mixer and heated to 65° C. and mixed for one hour while under a vacuum until the batch begins to break up. The temperature of the mixer is reduced to 38° C. and the blades of the mixer are run forward and reversed to break up the composition into a granular powder consistency.

The granular powder is then charged onto a two roll mill in which one roll is heated to about 100° C. and the other is at about 5° C. A current of 6 amperes is applied to the mill and the powder is milled for about 30–35 minutes applying about 120 foot pounds per gram of the amount of powder charge until a pencil bead is formed between the two rolls. The composition is then stripped from the two rolls and as the composition cools, it is broken into small pieces or chips.

A black dispersion lacquer then is formed as follows:

Portion 1:                                         Parts by weight
   Methylethyl ketone _____ 47.79
   Toluene _____ 23.95
   Coconut oil/ethylene glycol/phthalic anhy-
     dride plasticizer _____ 56.65
   Silicone paint additive _____ 0.23
Portion 2:
   Pigment chips (prepared above) _____ 23.37
Portion 3:
   Acrylic dispersion resin solution (described
     above) _____ 149.69
Portion 4:
   Acrylic dispersion resin solution _____ 371.47
Portion 5:
   VM & P naphtha _____ 74.85

Total _____ 748.00

Portion 1 is charged into a high speed mixer and mixed for 5 minutes. Portion 2 is added and mixed for about 8–12 hours or until the pigment chips dissolve. Portion 3 is then added with mixing and mixing is continued for 1 hour while maintaining the temperature of the mixture below 55° C. Portion 4 is added with mixing while maintaining the temperature of the mixture below 50° C. Portion 5 then is added at a rate of about 1.5–2.0 gallons per minute with mixing and mixing is continued for about 1 hour after the addition and then the resulting pigmented lacquer is filtered.

The lacquer is reduced to a spray viscosity with conventional solvents and then sprayed onto a steel panel primed with a pigmented alkyd resin and sealed with an epoxy sealer and the panel is baked for about 30 minutes at 165° C. The resulting finish has a good appearance, high gloss, excellent hardness, is resistant to blistering by high humidity and water soaking and to chipping and to weather deterioration.

EXAMPLE 2

Pigment chips are prepared as follows:

Parts by weight
Transparent yellow iron oxide pigment _____ 24.0
Cellulose acetate butyrate [1] _____ 12.0
Acrylic dispersion resin solution [2] _____ 64.0

Total _____ 100.0

[1] Described in Example 1.
[2] 38.6% solids of a copolymer of methyl methacrylate/allyl methacrylate/diethylaminoethyl methacrylate/2 - ethylhexyl acrylate weight ratio of 82.8/0.6/0.8/15.8 wherein the graft copolymer has a backbone of methyl methacrylate/allyl methacrylate/diethylaminoethyl methacrylate and a side chain of 2-ethylhexyl acrylate.

The above ingredients are mixed together using the procedure described in Example 1. The resulting granular powder then is milled on a two roll mill using the same roll temperatures and procedure as described in Example 1 giving pigment chips upon cooling the product.

A yellow dispersion lacquer then is prepared by using the same constituents and blending procedure as in Example 1 except the above acrylic dispersion resin solution is used and 93.48 parts by weight of the above prepared pigment chips are added. Small amounts of other colorants are added to provide the desired shade. The lacquer is reduced to a spray viscosity, applied to a primed and sealed steel substrate using the same procedure as in Example 1 and baked. The resulting finish has the same appearance and properties as the finish of Example 1.

EXAMPLE 3

Pigment chips are prepared as follows:

Parts by weight
Organic magenta toner quinacridone type pigment
  (finely divided blue-red pigment) _____ 24.0
Cellulose acetate butyrate (described in Example 1) _____ 12.0
Acrylic dispersion resin solution (described in Example 2) _____ 64.0

Total _____ 100.0

The above ingredients are mixed together using the procedure described in Example 1. The resulting granular powder then is milled on a two roll mill using the same roll temperatures and procedure as described in Example 1 giving pigment chips upon cooling of the product.

A red dispersion lacquer is prepared by using the same constituents and blending procedures as in Example 1 except the above acrylic dispersion resin solution is used and 93.48 parts by weight of the above prepared pigment chips are added.

The lacquer is reduced to a spray viscosity, applied to a primed and sealed steel substrate using the same procedure as in Example 1 and baked. The resulting finish has the same appearance and properties as the finish of Example 1.

EXAMPLE 4

Pigment chips are prepared as follows:

Parts by weight
Transparent red iron oxide pigment _____ 19.7
Cellulose acetate butyrate (described in Example 1) _____ 9.9
Acrylic resin dispersion solution (described in Example 2) _____ 70.4

Total _____ 100.0

The above ingredients are mixed together using the procedure described in Example 1. The resulting granular powder then is milled on a two roll mill using the same roll temperatures and procedure as described in Example 1 giving pigment chips upon cooling of the product.

A red dispersion lacquer is prepared by using the same constituents and blending procedures as in Example 1 except the above acrylic dispersion resin solution is used and 105.80 parts by weight of the above prepared pigment chips are added.

The lacquer is reduced to a spray viscosity, applied to a primed and sealed steel substrate using the same procedure as in Example 1 and baked. The resulting finish has the same appearance and properties as the finish of Example 1.

EXAMPLE 5

Pigment chips are prepared as follows:

Parts by weight
"Perylene" red pigment _____ 21.0
Cellulose acetate butyrate (described in Example 1) _____ 11.5
Acrylic dispersion resin solution (described in Example 2 _____ 68.4

Total _____ 100.9

The above ingredients are mixed together using the procedure described in Example 1. The resulting granular powder then is milled on a two roll mill using the same roll temperatures and procedure as described in Example 1 giving pigment chips upon cooling of the product.

A red dispersion lacquer is prepared by using the same constituents and blending procedure as in Example 1 except the above acrylic dispersion resin solution is used and 105.80 parts by weight of the above prepared pigment chips are added.

The lacquer is reduced to a spray viscosity, applied to a primed and sealed steel substrate using the same procedure as in Example 1 and baked. The resulting finish has the same appearance and properties as the finish of Example 1.

EXAMPLE 6

Pigment chips are prepared as follows:

| | Parts by weight |
|---|---|
| "Monastral" blue pigment (phthalocyanine blue pigment) | 24 |
| Cellulose acetate butyrate (described in Example 1) | 12 |
| Acrylic dispersion resin solution (described in Example 2) | 64 |
| Total | 100 |

The above ingredients are mixed together using the procedure described in Example 1. The resulting granular powder then is milled on a two roll mill using the same roll temperatures and procedure as described in Example 1 giving pigment chips upon cooling of the product.

A blue dispersion lacquer is prepared by using the same constituents and blending procedure as in Example 1 except the above acrylic dispersion resin solution is used and 93.48 parts by weight of the above prepared pigment chips are used.

The lacquer is reduced to a spray viscosity, applied to a primed and sealed steel substrate using the same procedure as in Example 1 and baked. The resulting finish has the same appearance and properties as the finish of Example 1.

EXAMPLE 7

Pigment chips are prepared as follows:

| | Parts by weight |
|---|---|
| "Monastral" orange pigment | 20.1 |
| Cellulose acetate butyrate (described in Example 1) | 11.5 |
| Acrylic dispersion resin solution (described in Example 2) | 68.4 |
| Total | 100.0 |

The above ingredients are mixed together using the procedure described in Example 1. The resulting granular powder than is milled on a two roll mill using the same roll temperatures and procedure as described in Example 1 giving pigment chips upon cooling of the product.

An orange dispersion lacquer is prepared by using the same constituents and blending procedure as used in Example 1 except the above acrylic dispersion resin solution is used and 105.80 parts of the above prepared pigment chips are used.

The lacquer is reduced to a spray viscosity, applied to a primed and sealed steel substrate using the same procedure as in Example 1 and baked. The resulting finish has the same appearance and properties as the finish of Example 1.

What is claimed is:

1. An improved process for preparing a pigmented acrylic resin dispersion lacquer coating composition which comprises the following steps:
   (1) blending together the following constituents to form a pigment/polymer blend
      15–50% by weight of a pigment;
      15–35% by weight of cellulose acetate butyrate having a butyryl content of about 30–55% by weight and a viscosity at 25° C. of about 0.5–5 seconds measured according to ASTM D–1343–56;
      15–55% by weight of a film-forming acrylic resin; and
      0–20% by weight of an organic plasticizer for said acrylic resin;
   (2) heating the pigment/polymer blend prepared in step (1) to about 30–110° C. while mixing and applying a vacuum of at least 20 inches of mercury to form a powder;
   (3) mixing the powder under high shear conditions by charging the powder into a two roll mill having one hot roll at about 65–125° C. and a cold roll at about 0–30° C. for about 5–40 minutes while applying 75–400 foot pounds per gram of charge per minute to form pigment chips;
   (4) forming a mill base having a solids content of about 20–60% by weight, by dissolving the chips prepared in step (3) in an organic solvent for the chips; and
   (5) blending the mill base prepared in step (4) with an acrylic resin dispersion lacquer coating composition comprising 10–60% by weight of a film-forming binder of an acrylic resin dispersed in an organic liquid to form a pigmented coating composition having a pigment to binder ratio of about 2:100 to about 70:100;

wherein said acrylic resin comprises
   a graft copolymer having a backbone (A) and one or more side chains (B), the backbone (A) being a polymeric segment of units (a) and up to 15% by weight of units (b), said (b) units providing available active grafting sites for graft polymerization, and each side chain (B) above being a polymeric segment, (A) and (B) being different from each other, and (a) and (B) each being composed of at least 50% by weight of units of esters of acrylic, methacrylic and/or ethacrylic acid; and wherein the graft copolymer is selected from the group consisting of
   a copolymer prepared by polymerizing methyl methacrylate/allyl methacrylate/diethylamino methacrylate/2-ethyl hexyl acrylate to form a graft copolymer in which the (a) monomer units of the (A) segment consist of methyl methacrylate; and (b) monomer units of (A) segment consist of allyl methacrylate and diethylaminoethyl methacrylate, and the monomer units of (B) segment consists of 2-ethylhexyl acrylate; and
   a copolymer prepared by polymerizing methyl methacrylate/isodecyl methacrylate/methacrylic acid/acrylonitrile to form graft copolymer in which the (a) monomer units of the (A) segment consist of methyl methacrylate, isodecyl methacrylate, methacrylic acid, and (b) monomer units of the (A) segment consist of allyl methacrylate and monomer units of the (B) segment consist of acrylonitrile.

2. The process of Claim 1 in which the cellulose acetate butyrate has a viscosity of 1–2 seconds measured as in Claim 1 and a butyryl content of about 30–40% by weight.

3. The process of Claim 1 in which the acrylic resin consists essentially of a graft copolymer prepared by polymerizing methyl methacrylate/allyl methacrylate/diethyl aminoethyl methacrylate/2-ethylhexyl acrylate to form graft copolymer in which the (a) monomer units of the (A) segment consist of methyl methacrylate; and (b) monomer units of (A) segment consists of allyl methacrylate and diethylaminoethyl methacrylate and the monomer units of (B) segment consist of 2-ethylhexyl acrylate.

4. The process of Claim 2 in which the acrylic resin consists essentially of a graft copolymer prepared by polymerizing methyl methacrylate/isodecyl methacrylate/allyl methacrylate/acrylonitrile to form graft copolymer in which the (a) monomer units of the (A) segment consist of methyl methacrylate and isodecyl methacrylate; and (b) monomer units of (A) segment consists of allyl methacrylate and monomer units of the (B) segment consist of acrylonitrile.

5. The process of Claim 3 in which the pigments are selected from the group consisting of iron oxide pigments, isoindolinone pigments, phthalocyanine pigments, quinacridone pigments and carbon black pigments.

6. The process of Claim 5 in which 5–15% by weight of a plasticizer of butylbenzyl phthalate is used.

7. The process of Claim 5 in which 5–15% by weight of a plasticizer blend of ethylene glycol adipate benzoate and neopentyl glycol adipate benzoate is added.

8. The process of Claim 4 in which 5–15% by weight of a coconut oil/ethylene glycol/phthalic anhydride plasticizer is added.

9. The improved process of Claim 1 for preparing a pigmented acrylic resin dispersion lacquer coating composition which comprises the following steps:

(1) blending together the following constituents to form a pigmented polymer blend 20–40% by weight of a pigment selected from the group consisting of iron oxide pigments, isoindolinone pigments, phthalocyanine pigments, quinacridone pigments and carbon black pigments, 20–30% by weight of cellulose acetate butyrate having a butyryl content of about 30–40% by weight and a viscosity of about 1–2 seconds measured at 25° C. measured according to ASTM D–1343–56;

40–50% by weight of an acrylic resin added in the form of an acrylic resin dispersion lacquer coating composition comprising 10–60% by weight of a binder of a film-forming acrylic resin dispersed in an organic liquid, wherein the film-forming acrylic resin comprises a graft copolymer having a backbone (A) and one or more side chains (B), the backbone (A) being a polymeric segment of units (a) and up to 15% by weight of units (b), said (b) units providing available active grafting sites for graft polymerization, and each side chain (B) above being a polymeric segment, (A) and (B) being different from each other, and (a) and (B) each being composed of at least 50% by weight of units of esters of acrylic methacrylic and/or ethacrylic acid, provided that either (A) or (B) if prepared as a separate polymeric entity, is substantially soluble in said organic liquid, whereas, the other of (A) or (B), if prepared as a separate polymeric entity, is substantially insoluble in the same organic liquid, wherein the acrylic resin is selected from the group consisting of a copolymer prepared by polymerizing methyl methacrylate/allyl methacrylate/diethylamino methacrylate/2-ethyl hexyl acrylate to form graft copolymer in which the (a) monomer units of the (A) segment consist of methyl methacrylate; and (b) monomer units of (A) segment consists of allyl methacrylate and diethylaminoethyl methacrylate, and the monomer units of (B) segment consists of 2-ethylhexyl acrylate; and a copolymer prepared by polymerizing methyl methacrylate/isodecyl methacylate/methacrylic acid/acrylonitrile to form graft copolymer in which the (a) monomer units of the (A) segment consist of methyl methacrylate, isodecyl methacrylate, methacrylic acid, and (b) monomer units of the (A) segment consist of allyl methacrylate and monomer units of the (B) segment consist of acrylonitrile;

(2) heating the pigment blend prepared in step (1) to about 35–75° C. while mixing and applying a vacuum of about 20–26 inches of mercury to remove organic liquid from the blend and to form a powder;

(3) mixing the powder under high shear conditions by charging the powder into a two roll mill having one hot roll at about 90–110° C. and a cold roll at about 0–10° C. for about 20–35 minutes while applying 75–400 foot pounds per gram of charge per minute to form pigment chips;

(4) forming a mill base having a solids content of about 20–60% by weight, by dissolving the chips prepared in step (3) in an organic solvent for the chips; and (5) blending the mill base prepared in step (4) with an acrylic resin dispersion lacquer coating composition described in step (1) to form a pigmented coating composition having a pigment to binder ratio of about 2:100 to about 70:100.

References Cited

UNITED STATES PATENTS

| 3,660,537 | 5/1972 | Lee | 260—885 |
| 3,691,126 | 9/1972 | Walus | 260—29.6 RB |
| 2,652,339 | 1/1948 | Yaeger | 106—79 |

FOREIGN PATENTS

| 612,313 | 1/1961 | Canada | 260—17 |
| 1,500,730 | 11/1967 | France. | |

WILLIAM H. SHORT, Primary Examiner

P. F. KULKOSKY, Assistant Examiner